May 12, 1970　　　　　A. J. SCALORA　　　　3,511,845
METHOD OF MOLDING PLASTIC ARTICLES
Filed June 22, 1966　　　　　　　　　　2 Sheets-Sheet 1

INVENTOR.
Anthony J. Scalora
BY Philip M. Rice
＆ W. A. Schaich
ATT'YS.

May 12, 1970  A. J. SCALORA  3,511,845
METHOD OF MOLDING PLASTIC ARTICLES
Filed June 22, 1966  2 Sheets-Sheet 2

INVENTOR.
Anthony J. Scalora
BY Philip M. Rice
& W. A. Schaich
ATTYS.

United States Patent Office 3,511,845
Patented May 12, 1970

---

3,511,845
METHOD OF MOLDING PLASTIC ARTICLES
Anthony J. Scalora, Toledo, Ohio, assignor to Owens-Illinois, Inc., a corporation of Ohio
Filed June 22, 1966, Ser. No. 559,576
Int. Cl. B29d 1/00, 23/20
U.S. Cl. 264—294       4 Claims

ABSTRACT OF THE DISCLOSURE

A method of molding containers by filling a finish molding portion of a mold cavity with hot plasticized material, chilling the material to solidify a skin at the exterior thereof conforming to the finish molding portion, and inserting a core into the material to displace some of it into a narrow space between the core and mold but leaving the skin intact.

Background of the invention

This invention relates to methods of molding plastic articles, and more particularly to a compression molding method particularly adapted to the molding of thin walled collapsible tubes.

It has been proposed to make such collapsible tubes by a combination of injection molding and blow molding wherein a parison is first formed by injecting plasticized material into a very narrow gap between a parison plunger and a mold, and then the parison is blown into the final shape for the collapsible tube. It is very difficult to control the thickness of the sidewalls of the tubes and to achieve uniformity of wall thickness in the injection and blow molding process. One of the reasons is that because the sidewalls of the tubes are very thin, perhaps on the order of one-hundredth of an inch thick, the parison wall must also be quite thin, and it is difficult to force the plastic material uniformly through the narrow gap between plunger and mold required in order to injection mold the parison.

The plasticized material must be injected under very high pressure in order for it to flow throughout the mold gap. The parison plunger is ordinarily supported in the mold cavity in cantilever fashion with its free end near an injection orifice. When the plasticized material is injected past the free end of the plunger at such high pressures, there is a tendency for the material to deflect the plunger away from a centered position. This causes the material to flow and become distributed unevenly in the gap such that the wall of the parison is not uniform in thickness. This non-uniformity obviously carries over to the blown article and may even result in blowout in the blow molding step.

Since the injection and blow molding approach is a two-stage process, there is a relatively great amount of manipulation or processing involved in making each article. The output rate is consequently not as great as is desired for a very low cost item like collapsible tubes. In order to manufacture such tubes economically, the method and apparatus involved should be capable of producing the tubes at a high output rate and with a high yield of commercially acceptable tubes. The injection and blow molding process falls short of these goals.

Another problem encountered if collapsible tubes are made by injection and blow molding arises from the difficulty of injecting plasticized material through a narrow space and into and throughout the finish portion of the mold space which is ordinarily located remotely from the injection orifice. Particularly where thin wall parisons are formed by injection, there is a tendency for material to become chilled and solidified before reaching the remoter portions of the mold space. Thus, where the finish portion is remote from the injection orifice, it may not be formed accurately or completely due to premature freezing out of material. This calls for an increase in injection pressure, but high injection pressure has its drawbacks too, such as deflection of the parison plunger as referred to previously.

Summary of the invention

The present invention now proposes to make thin wall collapsible tubes by a compression molding method in which there is only a single molding step. This method employs a mold having an upright cavity therein with a finish molding portion, usually threaded, located at the bottom end of the cavity, and also employs a core having the configuration desired for the interior surfaces of the collapsible tubes. Starting with the core at least partially withdrawn from the cavity, hot plasticized plastic material in injected or extruded into the bottom end of the cavity to fill the finish molding portion of the cavity. The exterior surface of the plastic is chilled where it contacts the wall of the cavity, and due to this chilling, a thin skin of solidified plastic is formed which conforms to the finish molding portion of the mold. Accurate formation of the finish portion of the tube is assured and no high injection pressures are needed to force plasticized material into a finish portion, since it is located where material is initially introduced into the cavity.

The core is then inserted from the upper end of the cavity into the plasticized material at the bottom of the cavity with a free end of the core being placed concentrically within the finish molding portion of the mold. When the core is thus inserted, it defines with a boundary surface of the cavity a narrow gap having the shape desired for the thin side wall of the collapsible tube, and plasticized material is displaced by the core up into and throughout this gap to form the tube. The thin skin of plastic which was solidified by chilling remains intact at the exterior of the finish portion of the tube and the rest of the finish is formed between the finish molding portion of the cavity and the free end of the core which has been inserted therein.

The free end of the core may be designed to mold an opening in the finish or neck of the tube, or the neck may be molded closed to be blanked out later in a separate operation. Similarly threads may be molded on the exterior of the neck or threads may be formed later by a separate machining operation. If threads are molded on the neck, the finish molding portion of the mold is in the form of separable mold halves which may be parted to release the neck.

The core may be provided with an ejector member which closes the upper end of the cavity and which is telescopically movable relative to the core. After the tube has been molded, the core and ejector assembly is retracted with the tube on the core, and the tube is then pushed off the core by relative movement of the ejector along the length of the core.

Accordingly, it is an object of the present invention to provide a method of molding thin wall collapsible tubes wherein the actual molding may be accomplished in a single step.

Another object of the invention is to provide a compression molding method whereby a collapsible plastic tube is formed by displacement of plastic material into and throughout a mold space upon inserting a core into plasticized plastic material in a mold.

Still another object of the invention is to partially form a finish portion of a tube by chilling of plasticized material when it is introduced into a finish portion of a mold located at the entrance of the mold cavity, the rest of the tube being then formed by inserting a core into the plasticized material to displace material into a mold space in the form of the desired tube.

On the drawings

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings FIGS. 1 through 5 inclusive are a series of views illustrating how the method of the invention is carried out.

Figure 1:
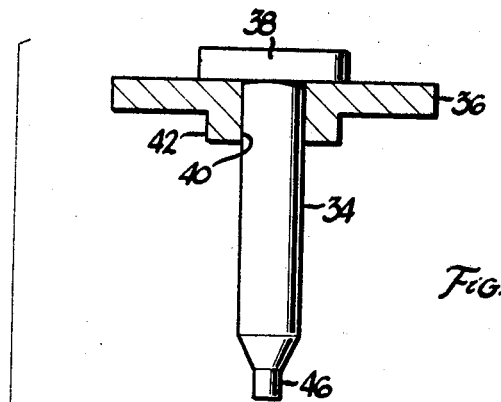
FIG. 1 is the first of a series of sectional views showing the steps of a compression molding method according to the invention, a mold, core and ejector being shown in mold open positions in this first view.

Starting with FIG. 1, there is provided a mold assembly 10 which includes mold members 12, 14 and 15. Mold member 12 has a cavity 16 formed therein by boundary surfaces 18, and the surfaces 8 define the body and shoulder portions of a collapsible tube to molded by the method of the invention. Mold member 12, preferably, is a solid block so as to prevent any mold lines from being formed in the body of the collapsible tube. Mold members 14 and 15 are halves of the finish molding portion of the mold assembly, and when members 14 and 15 are in their closed position as shown in FIG. 1, the surfaces 22 and 24 define the neck of the collapsible tube. Surfaces 22 and 24 are designed to mold threads on the finish of the tube, but as previously mentioned the neck may be molded without threads and threads may be machined in a later step separate from the molding operation. Mold members 14 and 15 are slidable transversely of the main cavity 18 and shoulders 26 and 28 of these mold members abut matching shoulders 30 and 32 of the mold member 12 when the neck mold members 14 and 15 are in their closed position as in FIG. 1.

Positioned above the mold assembly 10 is an assembly consisting of a core pin 34 and an ejector member 36, the core pin 34 having a head 38 on one side of the ejector 36 and extending through an aperture 40 in the ejector member. The ejector member 36 has an annular shoulder 42 of a shape to seat on a shelf 44 provided at the upper end of the mold cavity 16 in the mold block 12. The ejector member 36 is slidable along the length of the core pin 34 and is positioned against the head 38 of the core pin with the ejector and core in the position shown in FIG. 1.

Figure 2:
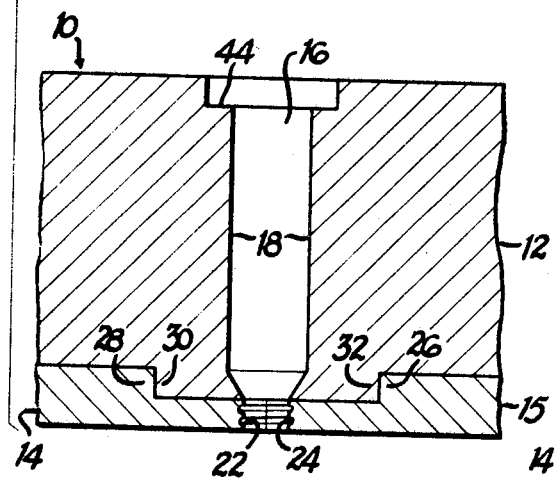
FIG. 2 is a sectional view showing the mold, core and ejector in mold closed positions and also showing plasticized plastic material which has been injected into the mold cavity.
Figure 2:
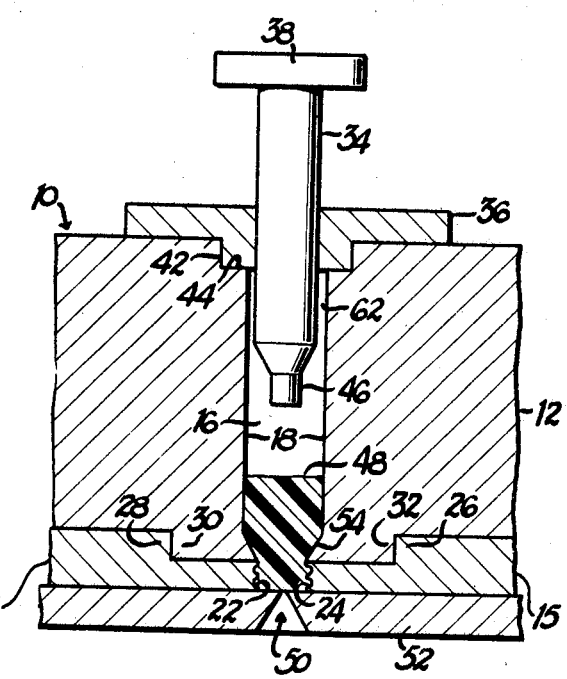

In FIG. 2, the ejector and core assembly has been placed down on the top of the mold assembly 10 with the shoulder 42 of ejector 36 sitting on the shelf 44 of the mold block 12. The core pin 34 is withdrawn part away through the ejector 36, so that its tip end 46 is withdrawn up away from the finish portion at surfaces 22 and 24 of members 14 and 15. This leaves ample space in the cavity 16 to allow plasticized plastic material to be introduced into the cavity. A "gob" or body 48 of plasticized plastic material is shown inside the cavity 18 filling the finish molding portion of the cavity at surfaces 22 and 24.

This plasticized plastic material has been injected into the cavity through an orifice 50 provided in a plate member 52 which may be clamped to the bottom of the mold assembly 10 in the position shown in FIG. 2. It may be noted that the plastic material 48 could be injected into the cavity 16 before the core pin 34 is inserted into the cavity. Obviously, the plasticized plastic material may be introduced into the cavity 16 through either its lower end as shown in FIG. 2 or a gob of material can be dropped into the cavity 16 or injected thereinto through its upper end if desired. In either case, the material goes to the bottom of the cavity and fills the finish molding portion of the cavity.

As soon as the hot plasticized plastic material is introduced into the mold cavity, it comes into contact with the mold surfaces 18, 22 and 24 bounding the mold cavity. This causes a thin skin of plastic material to solidify where it contacts the mold surfaces due to the chilling effect of those mold surfaces on the plastic material. Thus, the outside surface of the finish portion of the plastic tube is formed by chilling which occurs when the hot plastic material is introduced into the cavity. It may be seen that there is no problem of forcing plastic material to flow until it reaches the finish portion of the tube since the finish portion is right at the entrance to the cavity where plastic material is injected. This means that the plastic material may be injected at relatively low pressure, and it can even be directly extruded into the cavity without first pressurizing it as with an injection ram where high injection pressures are required. The plasticized material as initially introduced into the cavity may extend up to or beyond the shoulder 54 of the cavity-defining surfaces 18 as shown in FIG. 2, and in this case more than just the neck of the cavity is filled with plasticized material. Consequently, the skin which solidifies at the exterior surface of the plasticized material also extends to the shoulder 54.

Figure 6:
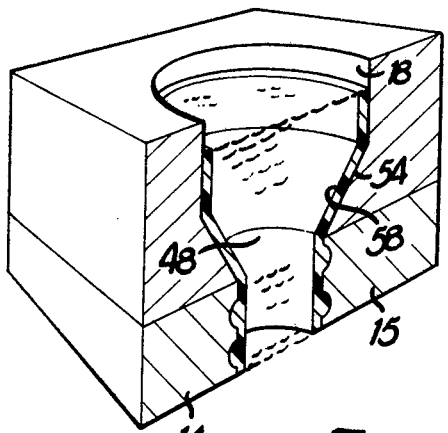
FIG. 6 is a perspective view, partly in section, showing how a skin of solidified plastic is formed at the finish portion of the tube by a chilling effect.

FIG. 6 shows pictorially how the solidified skin layer of plastic forms at the exterior of the plastic material in the neck or finish portion of the mold assembly 10. The skin 58 is shown as a solid layer conforming to the threads in the neck mold halves 14 and 15 and also extending along the shoulder portion 54 of the cavity defining surfaces 18. Inside the skin 58 there is the rest of the mass of plasticized plastic material 48.

Figure 3:
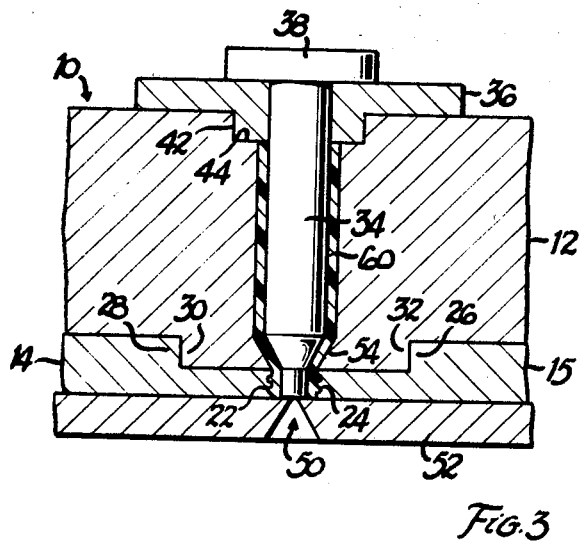
FIG. 3 shows the core fully inserted into the cavity and forming the collapsible tube between the core and the cavity wall.
Figure 5:
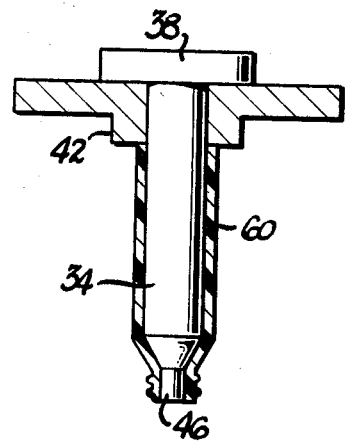
FIG. 5 shows the molded tube being ejected from the core.
Figure 5:
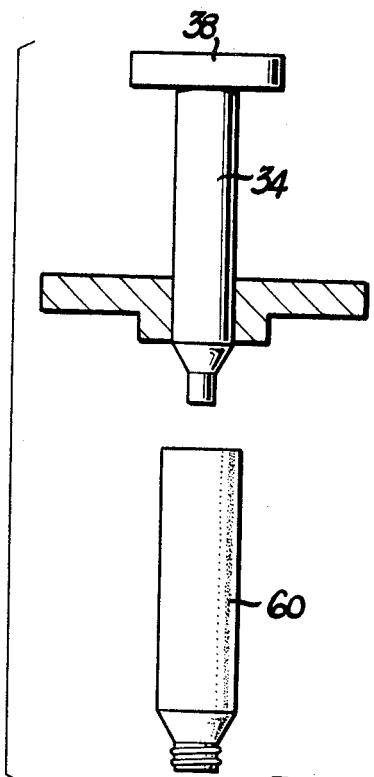

In FIG. 3, the core pin 34 with its tip portion 46 has been moved down and inserted into the plasticized plastic material 48 so as to compression mold the collapsible tube 60. It may be noted that as the core pin 34 moves into the cavity 16, the exterior surface of the core and the interior surface of the cavity have a narrow gap between them, a portion of this gap 62 being shown in FIG. 2.

In FIG. 3, the gap 62 is filled by the tube 60 and so is not visible, but it will be understood that this gap extends along the entire length of the core as it moves down into the cavity 16 and also into the plasticized material 48 at the bottom of the cavity. As the core 34 enters the plasticized plastic material, it displaces some of the material upward into the gap 62, and by the time the core has been fully inserted to its downward position as shown in FIG. 3, the entire gap 62 has been filled with plasticized material. Enough plasticized material is initially introduced into the cavity so that it will just fill the gap when the core 34 is fully inserted into the plasticized material.

In FIG. 3 it may be seen that the tip portion 46 of the core 34 extends down into the space within the finish molding surfaces 22 and 24 so as to mold an opening in the neck of the tube 60. However, as previously mentioned, the neck could be molded closed and blanked out in a later step after the molding operation.

Figure 4:
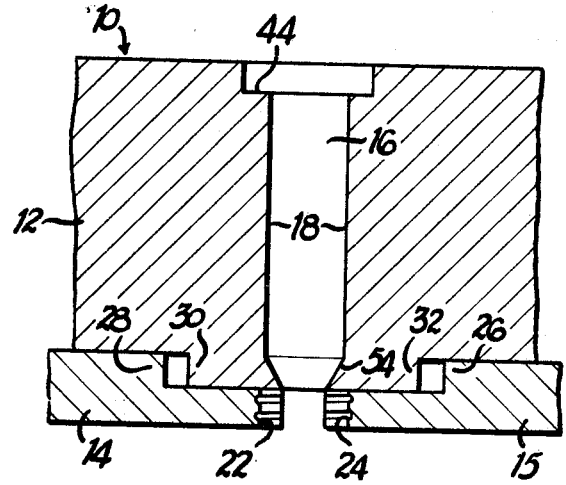
FIG. 4 illustrates the withdrawing of the core, tube and ejector from the mold cavity.

After the collapsible tube has been formed, the neck molding members 14 and 15 may be parted so as to release the tube, and this parting of the neck molding members is illustrated in FIG. 4 where the shoulders 26 and 28 of members 15 and 14 have been moved away from the matching shoulders 30 and 32 of the body mold 12.

The collapsible tube 60 preferably is removed from the cavity 16 by withdrawing the assembly of tube 34 and ejector 36 in the manner shown in FIG. 4. The tube and ejector are simply lifted off the mold assembly 10 and the tube 60 remains on the core 34 at this stage of the operation.

Finally, the tube 60 is ejected from the core 34 by pushing it off the core using the ejector member 36. This is accomplished by sliding the ejector member 36 along the length of the core 34, or alternatively, by pulling the tube 34 back through the ejector 36 while holding the ejector 36 stationary. In either case, the collapsible tube 60 is pushed off of the core to provide the final product. It may be noted in the illustrated embodiment of the invention that the collapsible tube 60 is open at both ends, and the tube is ordinarily filled from what becomes the bottom end of the tube in the finished product. After the tube is filled the bottom end is sealed shut.

The tube 60 is molded by a compression molding process which has only one molding step: that wherein the plasticized material within the mold cavity is displaced into the mold space defined between a core and the surfaces of the mold cavity. There is relatively little manipulation involved in carrying out the method, and tubes or other articles may be formed at a high rate of production once the method is mechanized. The method forms the finish portion of the collapsible tube very accurately since the exterior of the finish portion is actually formed by chilling before the rest of the tube is molded. There is no problem in getting sufficient material into the finish portion since the finish is located right at the entrance where plasticized material is introduced into the mold cavity. Removal of the final product from the core of the molding apparatus is facilitated by the ejector carried slidably on the core which may be moved to push the tube off of the core. The entire method can be carried out economically on a high production basis with a satisfactory yield of commercially acceptable products coming out of the molding process.

I claim:

1. A method of molding containers employing a mold including an upright elongated cavity portion and separable finish-defining mold portions underlying and communicating with the bottom of the cavity portion, said method comprising the steps of injecting hot plasticized plastic material into the bottom of said cavity portion through said finish-defining mold portions, chilling the exterior surface of said plasticized material due to its contact with said mold portions to form a solidified skin of plastic conforming to at least the finish-defining portions of said mold, after forming said skin inserting a core from the upper end of said cavity into said plasticized plastic material (1) to define a narrow gap between the boundary surface of said cavity portion and the side surface of said core with said gap having the shape desired for the body of a container, (2) to define the container finish between the lower extremity of the core and the finish-defining mold portions, (3) to displace plasticized plastic material from the bottom of said cavity portion up into and throughout said gap but leaving said plastic skin intact at said finish mold portion of said mold, thereby forming a container with a finish portion having the material of said skin at the exterior thereof, separating the finish-defining mold portions to release the finish and stripping said container from said mold and said core.

2. The method of claim 1 wherein said core has an ejector member slidable thereon and initially placed at an upper portion of said core to define the open end of said container opposite said finish portion thereof, the stripping of said container being carried out by relatively withdrawing said core and mold with said container carried on said core, and relatively telescoping said ejector member and said core to push said container off said core with said ejector member.

3. A method of molding containers employing a mold having a cavity therein with a finish molding portion at one end of said cavity, a core for insertion in said cavity and an ejector member slidably telescoped with said core, said method comprising the steps of introducing into said one end of said cavity sufficient plasticized plastic material to form said container, chilling the exterior surface of said plasticized material due to contact with said mold to form a solidified skin of plastic conforming to said finish portion, placing said ejector member over the other end of said cavity, after forming said skin inserting said core from said other end of said cavity into said plasticized plastic material in said cavity to displace some of said material between the boundary surface of said cavity and a side surface of said core without displacing said skin thereby forming an article on said core having the shape desired for a container and having a finish portion at one end thereof, removing said core with said ejector member and said molded article thereon from said mold, and ejecting said article from said core by relatively telescopically moving said core and said ejector member to push said article off said core.

4. The method claimed in claim 3 wherein the finish molding portion of said mold comprises mold members movable transversely of said cavity to open and close said finish molding portion, said step of removing said core with said ejector member and said article thereon including the opening of said mold members to release the finish portion of said article.

References Cited

UNITED STATES PATENTS

| 1,916,692 | 7/1933 | Scribner | 264—318 |
|---|---|---|---|
| 2,801,444 | 8/1957 | Lorenian. | |
| 2,899,705 | 8/1959 | Darlington | 264—318 |
| 3,256,378 | 6/1966 | Hauf | 264—267 |
| 2,903,746 | 9/1959 | Duhamed et al. | 18—26 |
| 3,114,596 | 12/1963 | Wechsler et al. | 264—327 |
| 3,125,619 | 3/1964 | Miller | 264—327 |
| 3,294,883 | 12/1966 | Polka | 264—327 |

ROBERT F. WHITE, Primary Examiner

J. R. THURLOW, Assistant Examiner

U.S. Cl. X.R.

264—323, 325, 327, 334, 331